United States Patent [19]

Agrawal et al.

[11] Patent Number: 5,412,774
[45] Date of Patent: May 2, 1995

[54] APPARATUS FOR AND METHOD OF DISPLAYING A DATA ITEM OF A DATABASE USING THE DISPLAY FUNCTION OF A SELECTED DATA ITEM

[75] Inventors: Rakesh Agrawal, San Jose, Calif.; Narain H. Gehani, Summit, N.J.; Jagannathan Srinivasan, West Lafayette, Ind.

[73] Assignee: AT&T Corp., Murray Hill, N.J.

[21] Appl. No.: 147,469

[22] Filed: Nov. 3, 1993

Related U.S. Application Data

[63] Continuation of Ser. No. 574,825, Aug. 29, 1990, abandoned.

[51] Int. Cl.⁶ .............................................. G06F 15/62
[52] U.S. Cl. ................................ 395/157; 395/154; 395/600
[58] Field of Search ........................ 395/155–161, 395/153–154, 119–120, 600, 700; 340/401–404; 345/117, 118

[56] References Cited

U.S. PATENT DOCUMENTS

| | | | |
|---|---|---|---|
| 4,723,211 | 2/1988 | Barker et al. | 395/147 |
| 4,815,029 | 3/1989 | Barker et al. | 395/146 |
| 4,918,588 | 4/1990 | Barrett et al. | 395/600 |
| 4,954,969 | 9/1990 | Tsumura | 395/154 |
| 4,962,475 | 10/1990 | Hernandez et al. | 395/157 |
| 4,982,344 | 1/1990 | Jordan | 395/157 |
| 5,025,395 | 6/1991 | Nose et al. | 395/154 |
| 5,079,695 | 1/1992 | Dysart et al. | 395/700 |
| 5,109,482 | 4/1992 | Bohrman | 395/154 |
| 5,121,477 | 6/1992 | Koopmans et al. | 395/156 |
| 5,159,669 | 10/1992 | Trigg et al. | 395/159 |
| 5,161,223 | 11/1992 | Abraham et al. | 395/600 |
| 5,161,225 | 11/1992 | Abraham et al. | 395/600 |

OTHER PUBLICATIONS

*Hyper Card User's Guide*, Apple Computer, Inc., 1988, pp. 1–19, 32–63, 72–81, 120–129, 146–161.
DeMaria et al, "Working with dBase Mac", Brady Books, 1988, pp. 35–52, 94–134, 184–210, 363–405, 227–241.
Foss, "Tools for Reading and Browsing Hypertext", Information Processing and Management, 1989, pp. 407–418.
Nielsen, "The Art of Navigating through Hypertext", Comm. of the ACM, Mar. 1990, pp. 298–309.
HyperCard User's Guide, Apple Corp, 1988, pp. 1–161, 185–195.
Bonner, "HyperCard on a PC?", PC-Computing, Jul. 1990, p. 94(2).
Campbell, "Macintosh in Instruction and Research", Sep. 1988, p. 549 (2) Summary.
Custer, "Stacking the Deck", MacUser, Dec. 1987, p. 112 (8).
Freedman, "Echelon Tool Automates Windows Programming", PC Week, Jul. 9, 1990, p. 57 (2).
Whitmer, "Stackware Moves into the Mainstream", MacWeek, Aug. 30, 1988, p. 5 (1).
Zilber, "Interactive Cultures", macUser, Oct. 1988, p. 100 (17).
Elliott, "Note Cards: HyperCard Could Become the Ultimate Musical Instruments", MacUser, Oct. 1988, p. 309 (9).
FullWrite Professional; A User's Guide, Ashton-Tate, 1988, pp. 99–122.

(List continued on next page.)

*Primary Examiner*—Mark R. Powell
*Assistant Examiner*—John E. Breene
*Attorney, Agent, or Firm*—John A. Caccuro

[57] ABSTRACT

A method and apparatus of operating a display system for displaying data items stored in an associated database. The database stores a display function for each data item class to be also stored in the database therein. When the user selects a data item class, a data item of and a display function associated with the selected data item class are retrieved from the database. The data item is used as an argument of a display function call. The system displays an object using the display data and the data format returned as the result of the display function call. The system may store multiple representations of each data item such as, pictorial, textual and audio representations which may be selected under user control.

21 Claims, 10 Drawing Sheets

OTHER PUBLICATIONS

Sound Master v 1.5, Tomlin, 1990, pp. 1–2.
Using Sound Notes, Ashton-Tate, 1990, pp. 1–4.
Myers, "Window Interfaces", IEEE Comp. Graphics and Appl. Sep. 1988, pp. 65–84.
Tsuda et al, "Ionic Browser", IEEE, 1989, pp. 130–137.
Burns et al, "A Graphical Entity-Relationship Database Browser", IEEE, 1988, pp. 694–704.
Rogers, "Visual Programming with Objects and Relations", IEEE, 1988, pp. 29–36.
Habbash et al, "Towards An Efficient Management of Objects In a Distributed Environment", IEEE, Jul. 1990, pp. 181–190.
Gupta et al., "An Extensible User Interface for an Object-Oriented VLSI CAD Framework", IEEE, Apr. 1990, pp. 559–568.
Rimvall et al, "GE's MEAD User Interface", 1989 IEEE Workshop, Dec. 1989, pp. 24–34.
Treadway, "Working with Windows", Computer Graphics World, Sep. 1988, pp. 79–86.
Breuer et al, "Cbase 1.0", IEEE, 1988, pp. 392–395.
*Proc. 1st Int'l. Conf. Expert Database Systems*, Apr. 1986, –59–72 "Displaying Database Objects", D. Maier, P. Nordquist and M. Grossman.
*Proc. 2nd Int'l. Conf. Expert Database Systems*, Apr., 1988, 107–131, "The Design of KIVIEW: An Object-Oriented Browser", A. Motro, A. D'Atri and L. Tarantino.
*Advanced Computer Graphics*, Springer-Verlag, 1986, "A New Graphics User Interface for Accessing a Database", C. T. Wu.
"The X Window System" by R. W. Scheifler and J. Gettys, ACM Trans. Graphics 5,2 (Apr. 1986, 79–109).
"Rationale for the Design of Persistence and Query Processing Facilities in the Database Programming Language O++", by R. Agrawal, et al. 2nd Int'l. Workshop on Database Programming Languages, Oregon Coast, Jun., 1989.
"Future Directions in DBMS Research", by E. Neuhold, et al, Tech. Rep. –88–001, Int'l. Computer Science Inst., Berkeley, Calif., May 1988.
"SEQUEL 2: A Unified Approach to Data Definition, Manipulation and Control", by D. D. Chamberlin, et al.; RJ, 1978, IBM, Jun. 1976.

FIG. 3
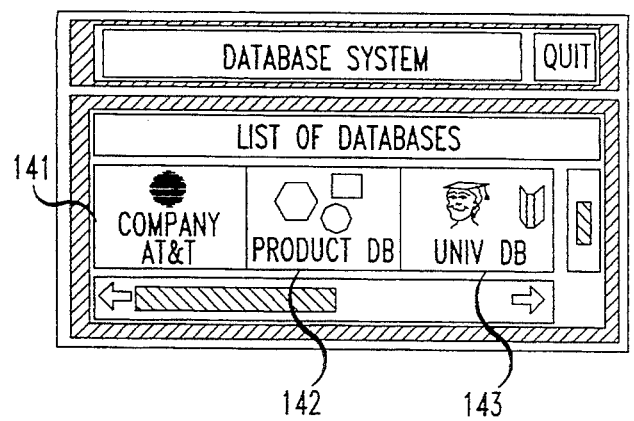
FIG. 4 SCHEMA WINDOW
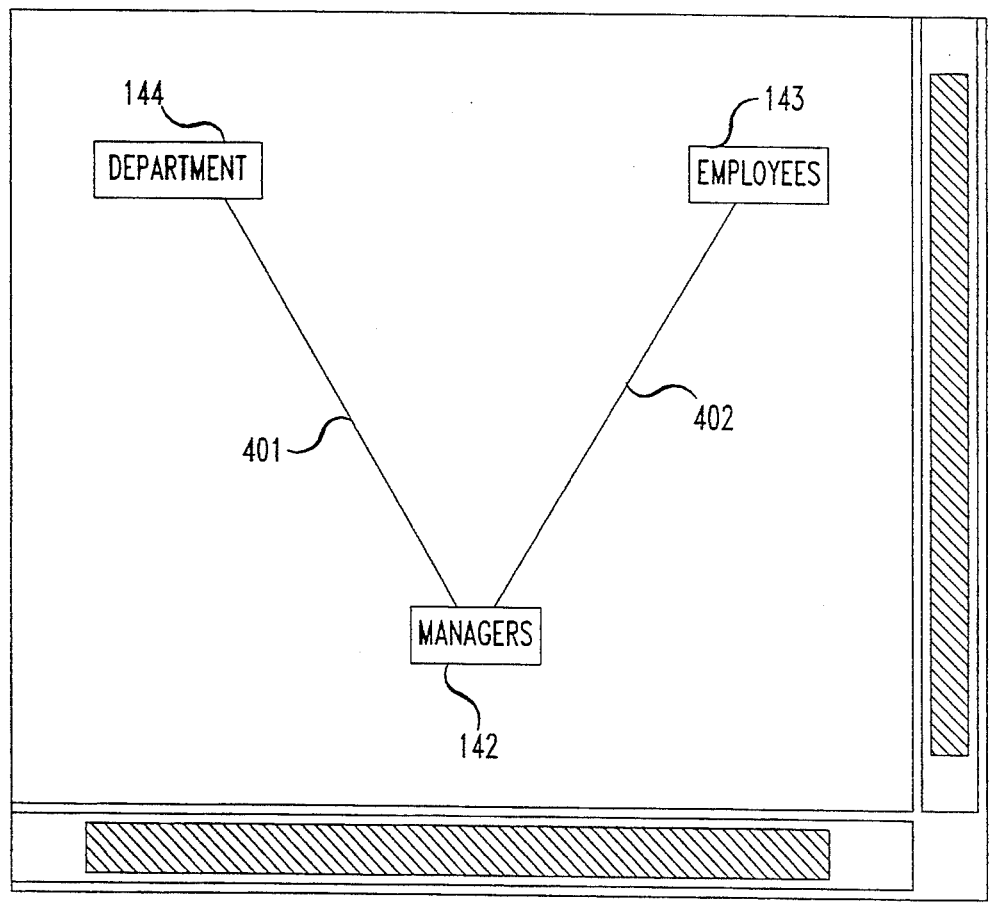

FIG. 12

1201
⌇DISPLAY SYSTEM TO DATABASE MANAGER CALL TO GET OBJECT
   DM (OBJECT CLASS X)

1202
⌇DATABASE MANAGER RESPONSE TO DISPLAY SYSTEM - POINTER Px
   TO OBJECT OF CLASS X AND DISPLAY FUNCTION OF CLASS X

1203
⌇DISPLAY SYSTEM TO DISPLAY FUNCTION CALL
   Px ⟶ DISPLAY ( )

1204
⌇DISPLAY FUNCTION RESPONSE TO DISPLAY SYSTEM
   DFR ⎡ WINDOW TYPE 1, LABEL 1, POINTER 1 TO DISPLAY BUFFER 1 ⎤
       ⎢ WINDOW TYPE 2, LABEL 2, POINTER 2 TO DISPLAY BUFFER 2 ⎥
       ⎣ WINDOW TYPE 3, LABEL 3, POINTER 3 TO DISPLAY BUFFER 3 ⎦

APPARATUS FOR AND METHOD OF DISPLAYING A DATA ITEM OF A DATABASE USING THE DISPLAY FUNCTION OF A SELECTED DATA ITEM

This application is a continuation of application Ser. No. 07/574,825, filed on Aug. 29, 1990, now abandoned.

TECHNICAL FIELD

This invention relates to database access systems and, more particularly, to apparatus for and method of displaying data items of a database.

BACKGROUND OF THE INVENTION

Providing access to on-line multi-media databases is becoming an important part of the marketing plan for many companies. Typically, a graphics terminal and an associated graphical interface program are provided to enable a user access to an on-line database. Undesirably, each time a new type or class of data objects (e.g., company employees) is added to the database, the graphical interface (front end) must be changed to enable the user to access the new class of data objects. Since databases are constantly being changed, the graphical interface must also constantly be changed. Moreover, since the database is typically accessed by a plurality of graphical terminals and workstations which are usually distributed over a number of different locations, changing the graphical interface becomes even more time-consuming and expensive. Additionally, since several different types of graphical terminals may be utilized to access the database, changes may have to be made to each of the different types of graphical interfaces utilized.

SUMMARY OF THE INVENTION

A display system apparatus and method in accordance with the present invention enable new classes of data items (e.g., objects) to be added to a database without requiring an associated change in the graphical interface of the display system. More particularly, each of the user-selectable data item classes (e.g., object classes) of the database have associated therewith a display function. The display function includes display primitives which describe how to display data items of the associated data item class. When a user at a system terminal selects a data item class for display, the system processes a data item of the selected class using the display function associated with the selected class to create a display of the data item. The processing, illustratively, includes calling the display function using the data item as an argument. The display function executes the call, interprets the item data and generates display data in a particular display format. The data item is displayed using data and a format returned in the response of the display function call.

In one embodiment, the response of the display function call includes a list of entries, each entry containing information at least about the display window type, label and the display data or a reference thereto. Through a series of selections from display windows, the user may browse or step through the various hierarchical relationships that exist between various data item classes of the database. According to another feature of the present invention, any of a variety of data items (e.g., well-known tuples) stored in corresponding database types (e.g., relational database) may be displayed. According to another feature of the present invention, the system may store multiple representations of each data item, such as pictorial, textual and audio representation which may be selected for output under user control. The display window type information enables the user to specify the media by which a selected data item may be displayed or outputted. According to yet another feature, a display function may be associated with each item and the user may select data items directly for display, rather than selecting data item classes.

BRIEF DESCRIPTION OF THE DRAWING

In the drawing,

FIG. 3 through FIG. 10 show illustrative screen displays which are displayed to the user fluting an illustrative operation of the present invention;

FIG. 12 shows some illustrative communication formats used by the present invention for controlling display system communications with the display function and object manager units of the database system.

DETAILED DESCRIPTION

In the following description, the first digit of a reference designation corresponds to the first FIG. in which that reference designation appears (e.g., 141 appears in FIG. 1).

Before describing the present invention, it should be recognized that the present invention may also be utilized as part of other similar type systems or as a stand-alone system. Such systems may utilize a variety of hardware and programming techniques. Thus, the present invention should be blended into the overall program structure of the system in which it is used and should be tailored to be compatible with other features and operations of the system. Thus, in order to avoid confusion and in order to enable those skilled in the art to practice the claimed invention, this specification will describe the operation of the present invention using illustrative flow charts, screen display, and communication format which describe the logical steps and the various parameters required to implement the invention.

Figure 1:
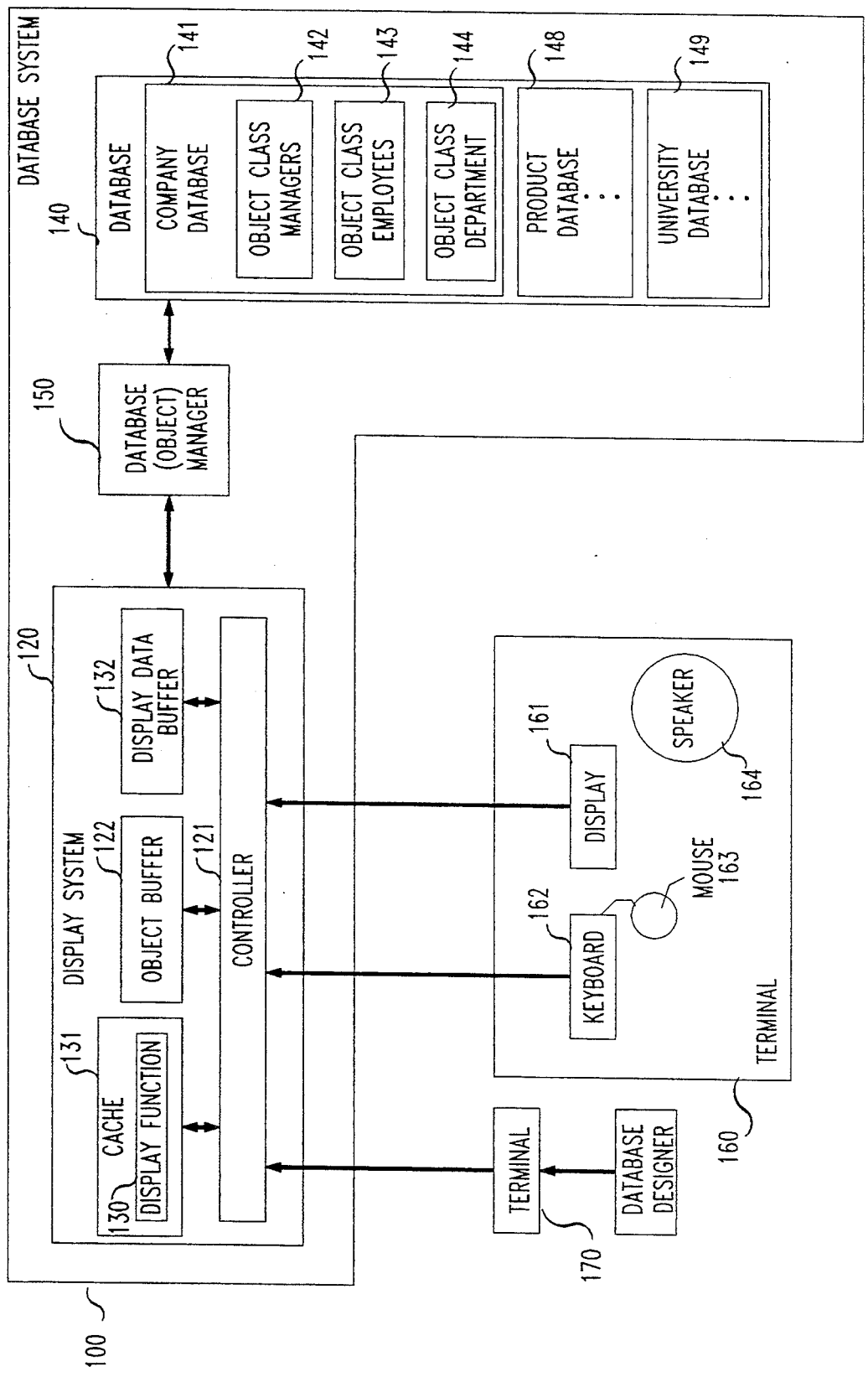
FIG. 1 shows symbolically an illustrative block diagram of a database system including a display system for accessing a database thereof.

Shown in FIG. 1 is an illustrative symbolic block diagram of a database system 100 which enables a user to access data items (e.g., objects) stored in a database. The database system 100 includes display system (or graphical interface) 120, database 140, database manager 150, user terminal 160 and display designer terminal 170. Controller 121 within display system 120 controls (a) the operation of display system 120 itself, (b) the operation of database system 100 and (c) the interface of terminals 160 and 170 to database system 100. Display system 120 generates the display screens (e.g., window displays of FIG. 3–FIG. 10) which appear on display 161 and receives user inputs via keyboard 162 and/or mouse 163.

The present invention is now described as part of a system where the data items are objects stored in an object database. In response to a user's input, requesting access to objects stored in database 140, display system 120 communicates the user's request to database manager 150 and receives object data and a display function as a response from database manager 150. The object data is stored in object buffer 122 and the display function 130 is stored in display function cache 131. The format of display system 120, calls to database manager 150 and the responses thereto are illustratively shown, respectively, as 1201 and 1202 of FIG. 12 which are more fully described in later paragraphs. In 1203 of FIG. 12, after receiving the pointer Px and the display function, display system 120 calls the display function using the pointer Px to the object buffer 122 as the argument (1203 of FIG. 12). Controller 121 then processes or executes the display function on the object data stored in object buffer 122. The display function response is shown in 1204 of FIG. 12 and includes a window type, label, and pointer to a display buffer 132. The display data buffer 132 stores the display data generated by the display function. Controller 121 communicates the display data to display 161 of terminal 160 to enable it to be displayed to the user.

Database manager 150 (also referred to herein as object manager) controls access to database 140, in a well known manner, in response to a call request made from display system 120 to obtain the desired information from database 140 for its response to display system 120. Database manager 150 may be implemented using the UNIX ® operating system. The graphical interface of display system 120 is, illustratively, implemented using the well-known X window system and HP-X widgets. The X environment is described in the article by R. W. Scheifler and J. Gettys, "The X Window System", *ACM Trans. Graphics* 5, 2 (April 1986, 79–109).

In one embodiment, display system 120 may be implemented as a collection of UNIX system processes. Briefly described, display system 120 is accessed as a single process that allows a user to access different databases (e.g., 141–149 of database 140). When the user selects a database, a "db-interactor" process is created that provides the interface for the user to interact with that database. This scheme allows for simultaneous interaction with multiple databases. Schema level operations such as viewing the object class hierarchy as well as inspecting the object class definitions are handled by the db-interactor process.

When the user wishes to examine objects of a particular object class, an "object-interactor" process is spawned. This process dynamically loads and executes the display function previously defined by a database class designer (a person who establishes the classes of the database) and also provides sequencing operations to scan all the persistent objects of that object class. According to one aspect of the invention, a separate process is used to handle requests for interacting with objects of a specific object class to isolate effects of software failures. The display function is the code written by the class or database designer. If there are bugs in this display function code, then only the corresponding object-interactor process will be affected but not the whole display system 120. Another advantage of using a separate process is that the user is given the option of choosing where to place the window corresponding to that object class (the X window system as an option allows a user to place the windows associated with the new UNIX process anywhere on the display). The details of the operation of the display system 120 in handling user database access requests are described in subsequent paragraphs.

Terminal 170 enables a database designer to access display system 120 to design the display function including the display formats (i.e., those shown in FIGS. 3–7) which display the object information retrieved by the user. As described in a later paragraph, one result of the database designer efforts is the organization of the database of FIG. 11 which associates the various display formats with each object class of database 140.

The database 140 is organized using a well-known "object paradigm" which allows database objects to be structured, retrieved and updated using application programs. The object-oriented database 140 may be defined, queried and manipulated using a well-known database programming language such as O++. The database programming language O++, which is based on the language C++, is described in the article of R. Agrawal and N. H. Gehani entitled "Rationale for the Design of Persistence and Query Processing Facilities in the Database Programming Language O++", 2nd Int'l. Workshop on Database Programming Languages, *Oregon Coast*, June 1989.

Objects of database 140 are classified in groups called object classes (also equivalently referred to herein as object types). Database 140 may typically include multiple specific databases, for example, company employee database 141, product database 148 and university database 149 of FIG. 1. Each specific database may typically include a plurality of object classes (e.g., company employee database 141 includes object classes or types such as managers 142, employees 143 and department 144). Each of the object classes 142-144 include a plurality of objects therein.

Figure 11:
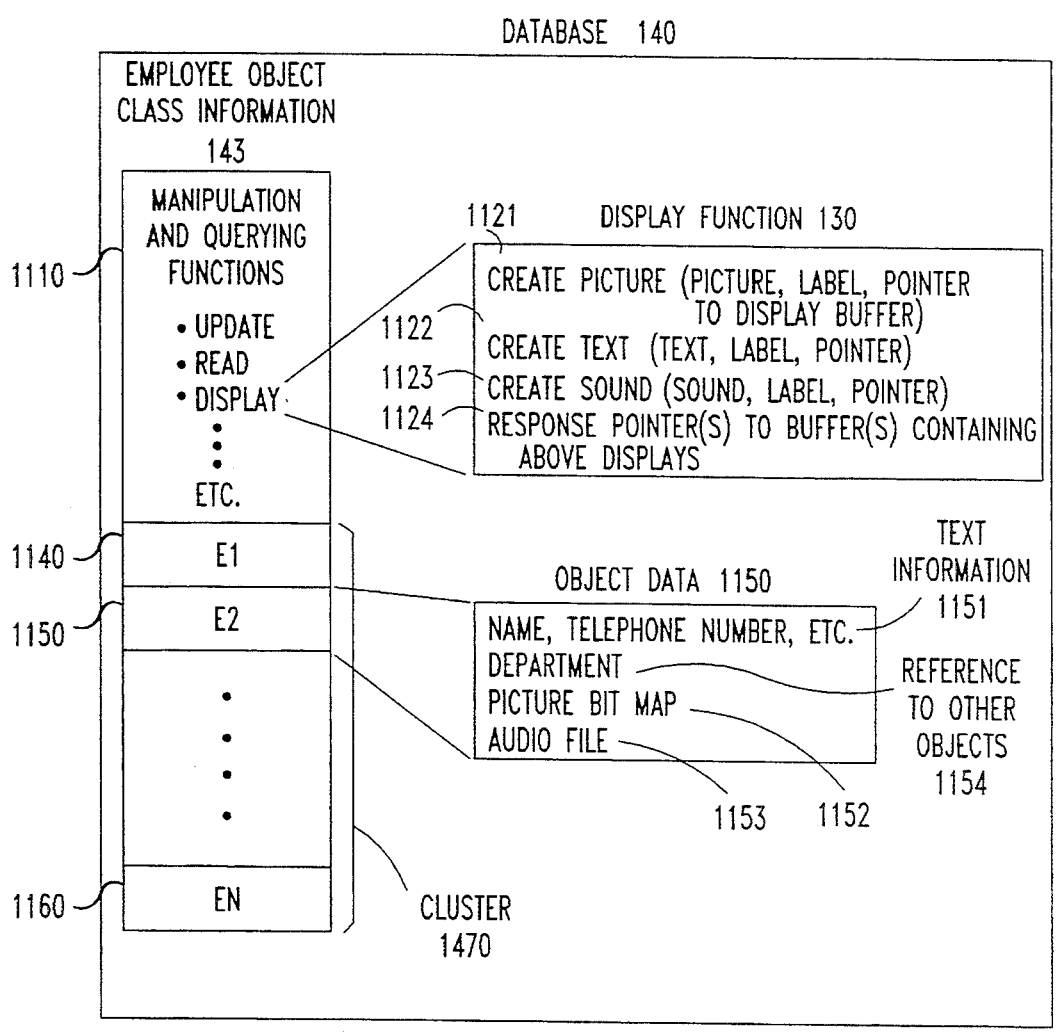
FIG. 11 illustrates the organization of an illustrative object class of a database in accordance with the present invention.

Shown in FIG. 11 is an illustrative employee object class 1100 containing manipulation and querying functions 1110 and employee cluster 1470. The employee cluster 1470 includes object data 1140, 1150 and 1160, respectively, for the various employee objects E1, E2 . . . EN. The manipulation and querying function 1110 include the well-known functions such as update, read, etc. In accordance with the present invention, a display function 130 is added to the list of manipulating and querying functions 1110. While the display function 130 is shown preferably associated with an object class, it may also be associated with each object of that class.

The display function response includes lists of function types (e.g., create picture (or graphics) 1121, text 1122, or sound 1123) which enable the user to obtain different representations of tile selected object. The display function identifies standard display primitives which are used to create the desired type of display. Thus, for example, the primitives may include those which describe the type of window, picture, text fonts, type of data format, etc. Advantageously, because the display function primitives of tile present invention can be handled by any type of graphical interface, the graphical interface need not be changed each time a new class of data objects requiring a different display format is added to the database.

Each display function includes a function name and associated code. The function code describes how the object data is to be manipulated by display system 120 to generate the particular representation (i.e., picture, text, sound, etc.) desired by the user. The display function response 1124 includes a pointer(s) which identifies the displays requested in the function call. The object data (e.g., employee E2-1150) includes text information 115 1 and data items such as name, telephone number, etc. The object data also includes a picture bit map 1152, an audio file 1153 and a reference to other objects in the database (e.g., department identification number).

Figure 2:
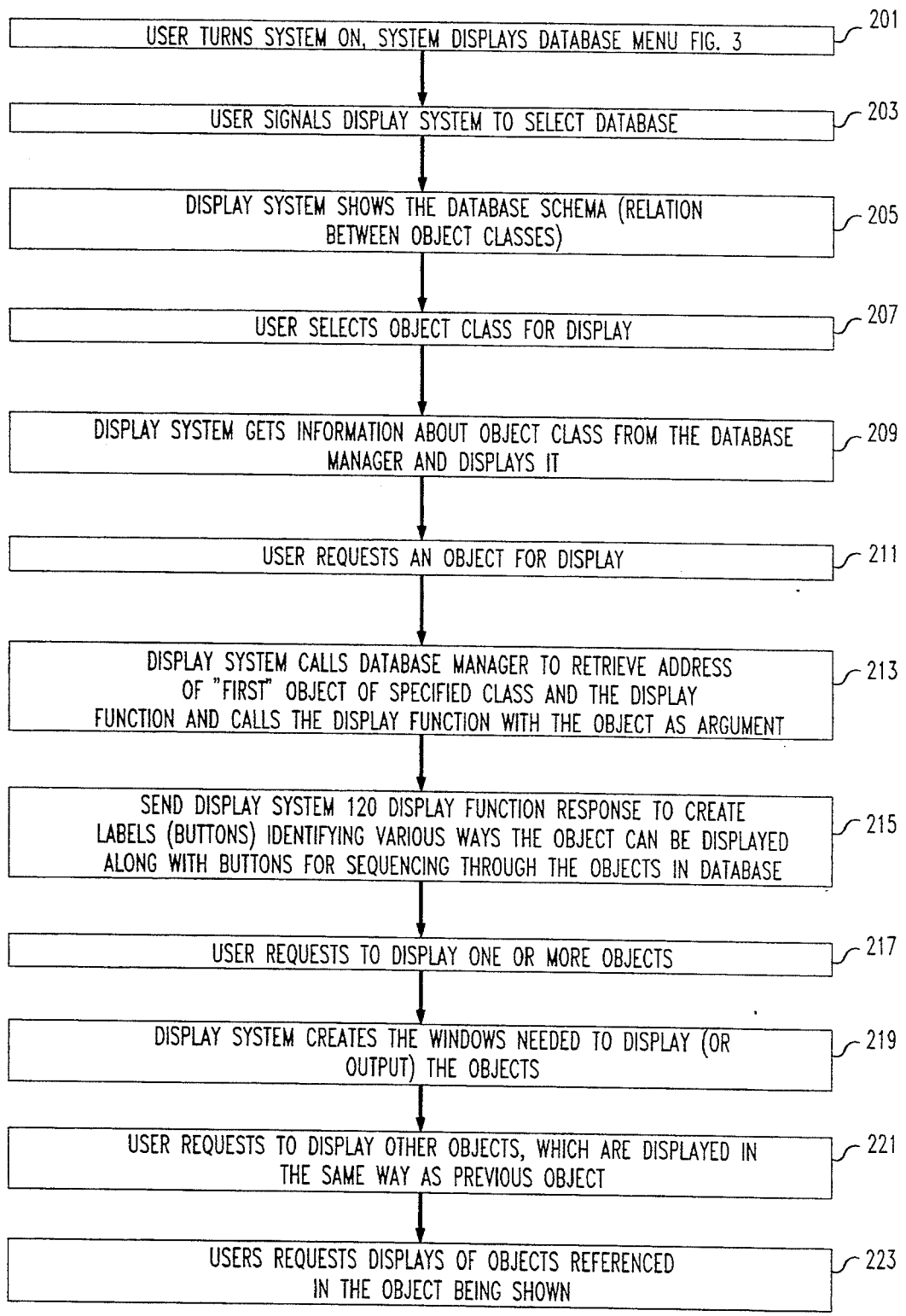
FIG. 2 is a flow diagram illustratively describing the operation of the present invention when utilized is the database system of FIG. 1.

With reference to FIG. 2, the operation of the present invention is described. FIG. 2 assumes that the database designer has previously stored object class information including object data and display function in the database 140 (as described in step 1301 of FIG. 13 and as shown in FIG. 11 ). Note, other object manipulation and querying functions can also be stored in the database 140. In step 201 after the user turns on the database system, display system 120 presents the user with the database menu shown in FIG. 3. This menu may be presented as a scrollable database window containing the names and iconified images of the current display system databases. In our example, the display window lists the specific databases, namely, company employee database 141, product database 148 and university database 149.

In step 203, the user selects a database to interact with by using mouse 163 to "click" on the appropriate icon. For example, assume the user selects the company employee database 141, identified by the company icon. Upon clicking on the company icon 141, display system 120, in step 205, opens a "class relationship" or schema window (FIG. 4) which displays the hierarchy relationship between the object classes (i.e., 142-144) in the company employee database 141. The hierarchical relationship between object classes (illustrated as nodes 142-144) is a set of directed acyclic graphs, or "dags". In FIG. 4 only one dag is shown, although in general a class relationship may include more than one. Display system 120 uses a well-known dag placement algorithm that minimizes crossovers to display dags.

The user can zoom in and zoom out to examine each dag at various levels of detail. In step 207, the user selects and/or examines an object class in detail by clicking at the node labeled with the class of interest. In step 209, clicking results in display system 120 opening of a "class information" window (FIG. 5) that has three scrollable subwindows, one for its superclasses 501, the second for its subclasses 502 and the third for the meta data 503 associated with this class. For example, clicking on employee class 143 of FIG. 4 results in the display window of FIG. 5 which shows that the employee class has no superclass, one subclass, i.e., manager, and that there are 55 objects in the employee class.

The class definition information window 504 also is selectable. Clicking thereon shows the class definition 505 which describes the types of information (name, room number, telephone number, etc.) available on each object of the employee class.

The user may continue schema browsing by selecting another object class node in tile schema graph (FIG. 4), or may click on one of the superclasses 501 or subclasses 502. For example, with reference to FIG. 6, clicking on the manager subclass 502 opens another window which shows that manager has employee as well as department as superclasses, that it has no subclasses, and there are seven objects listed as managers. According to another aspect of the present invention, the user may freely mix the browsing through tile class information and relationship windows.

Figure 5:
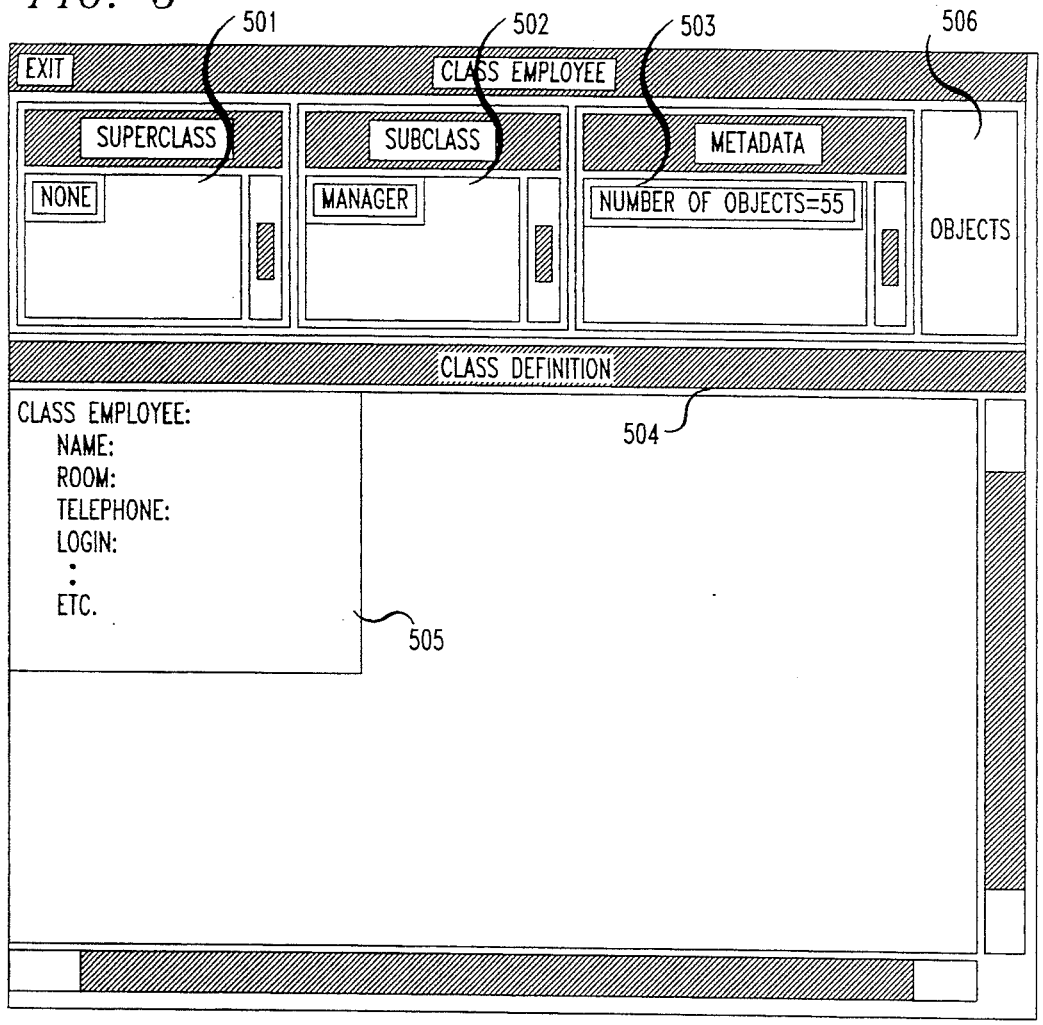
Figure 6:
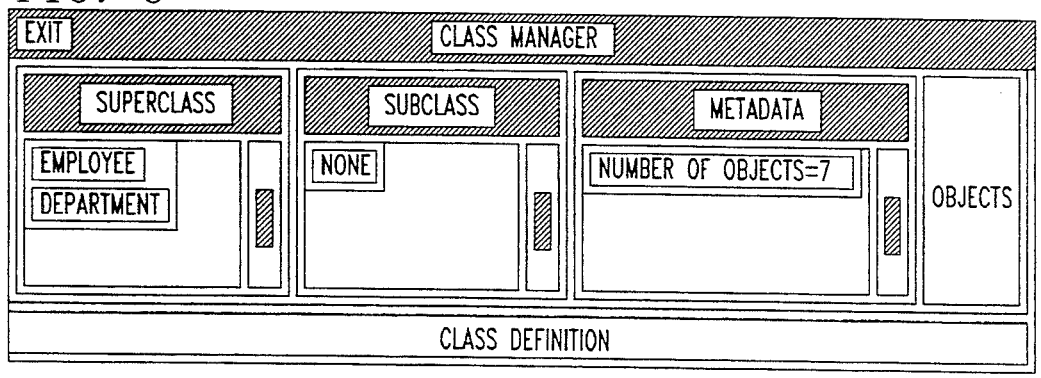

We assume that the user has returned to tile employee class window (FIG. 5). Associated with each class in database 140 is a set of persistent objects of that class (this set is called a cluster. The class definition window (FIG. 5) also has an "objects" button 506 that allows users to browse through tile objects (i.e., employees) in the cluster. In step 211, clicking this object button 506 opens the "object set" window (FIG. 7) which consists of two parts: the control panel 701 and object panel 702. The control panel 701 consists of buttons designated reset 703, next 704 and previous 705 which help the user to sequence through the objects. The control panel also includes the button designated quit 706. The object panel 702 has buttons to access text 707, picture 708, and sound 709. The object panel 702 also has a button 710 to access other employees of the department.

In step 213, in response to the user clicking on the objects button 506, display system 120 obtains the control panel 701 and object panel 702 information about the "first" object of tile specified class (i.e., employee class, FIG. 5). According to the present invention, display system 120 calls database manager 150 with the user-selected object class or type information as shown by 1201 of FIG. 12. It should be noted that if desired, tile database manager call 1201 may also include user-selected object identification information (not shown). The database manager 150 uses the information to locate the various forms of the object data (note, the object data may exist in textual, pictorial and audio forms). Display system 120 calls for the object data of tile first object of the selected object class and stores it in an object buffer (122 of FIG. 1). Database manager 150 responds with a response message as shown in 1202 of FIG. 12 which includes a pointer to the object buffer as well as tile display function associated with tile requested object class. Display system 120 then calls the display function 130 using the object buffer pointer as an argument Z in the display function call (1203 of FIG. 12). Note, 1203 of FIG. 12 illustrates the format of a C++ language function call.

In step 215, display function 130 accesses the selected object class information 1100 of FIG. 11 to obtain the information needed for a response 1204 to the display function call 1203. In the example of FIG. 11, assume that the argument $\chi$ is an object buffer pointer which identifies the employee E2 of the selected employee class (i.e., employee class is class X of FIG. 12).

The display function response 1204, in array or list form, provides entries to display system 120 to define the window types, button labels, and pointers to display buffers (132 of FIG. 1) which contain the data to be used to generate the display of the user-selected object. Note, while the display function cache 131, display data buffer 132 and object buffer 122 are shown as part of display system 120, they could also be included as part of the database manager 150. In such an embodiment, pointers to them would be located in display system 120. A more detailed description of the novel protocol between display system 120 and database manager 150 and display system 120 and display function 130 is set forth in later paragraphs.

Note that a database object can be displayed in one or more formats or display window types depending upon the data returned by display function response 1204 associated with the corresponding object class. The display function 1120 is created or designed for each object class by the database or class designer. The class designer interacts with display system 120 via terminal 170.

Figure 7:
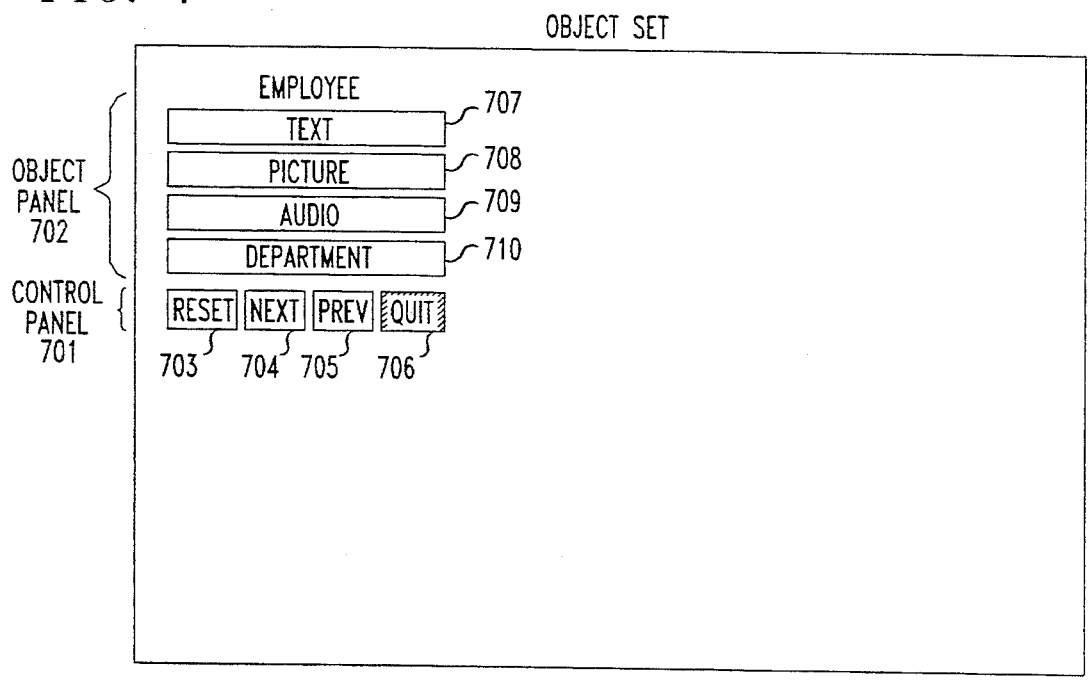

The display function response 1204 is used to create the display of FIG. 7 including button labels which identify the various ways the object can be displayed along with buttons for sequencing through the objects in database 140.

Figure 8:
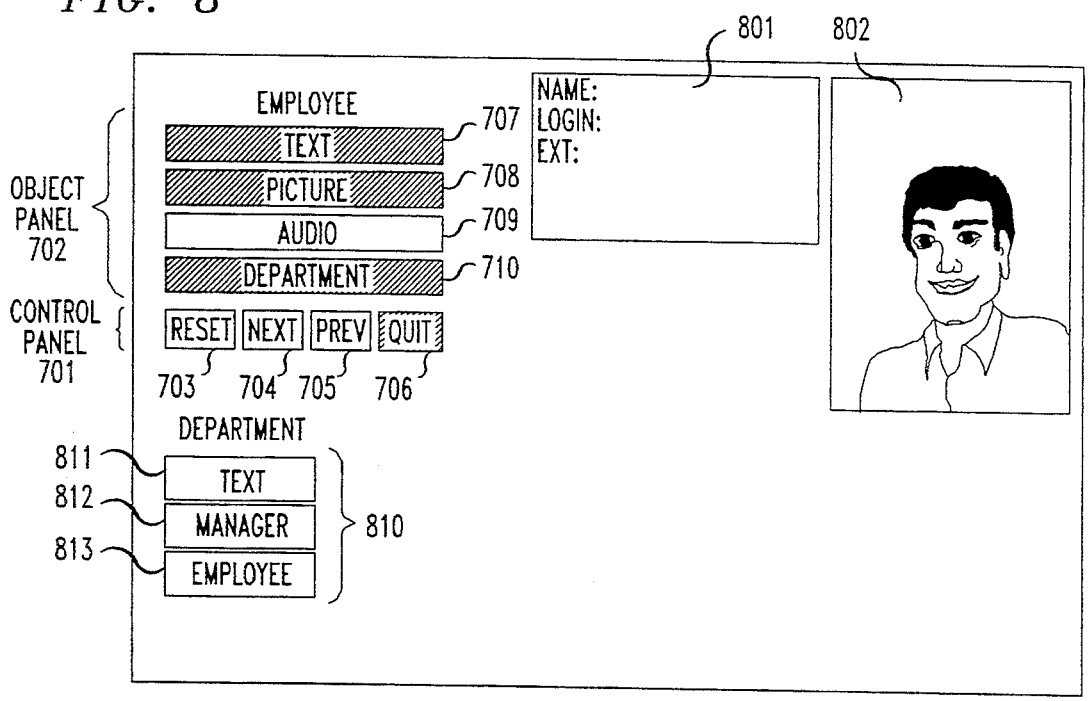

The object set window (FIG. 7) includes one button for each of the object display formats. For example, in step 217 the user can select the employee object to be outputted in textual form, in pictorial form, or in audio form. The object panel 702 provides appropriate buttons (707–709) to access these forms. Window 801 of FIG. 8 shows the text associated with an employee object after the user has clicked the text button 707 of FIG. 7. Window 802 shows an employee picture after user has clicked tile picture button 708 of FIG. 7. Note, for illustrative purposes an activated button is shown using cross-hatching (e.g., buttons 707 and 708). If the user selects the audio form by pressing button 709, speaker 163 of terminal 160 would output the "audio signature" of the employee object.

In step 219, in response to the user selection made in step 217, display system 120 creates the selected window to display the object or to output the selected audio signature of the object. In the example shown in FIG. 8, the display state of the employee objects consists of the object being displayed in both text 801 and picture 802 form. Display system 120 remembers the user-selected display state (i.e., text and picture form) of a cluster and if requested (in step 221), displays other user-selected objects in the cluster in the same display state (until the user changes the display state, e.g., by clicking the text button to close the text display).

Another aspect of the present invention provides the user with a browsing feature. An object may contain embedded references to other objects. The object panel 702 of an object set window FIG. 7 provides buttons for viewing these referenced objects. For example, employee objects (FIG. 7) refer to department objects (button 710). To view the department object associated with an employee, the user may, in step 223, click on tile department button 710. In response to step 223, display system 120 opens up an "object" window 810 of FIG. 8 which contains buttons 811–813 to view tile referenced department object.

Figure 9:
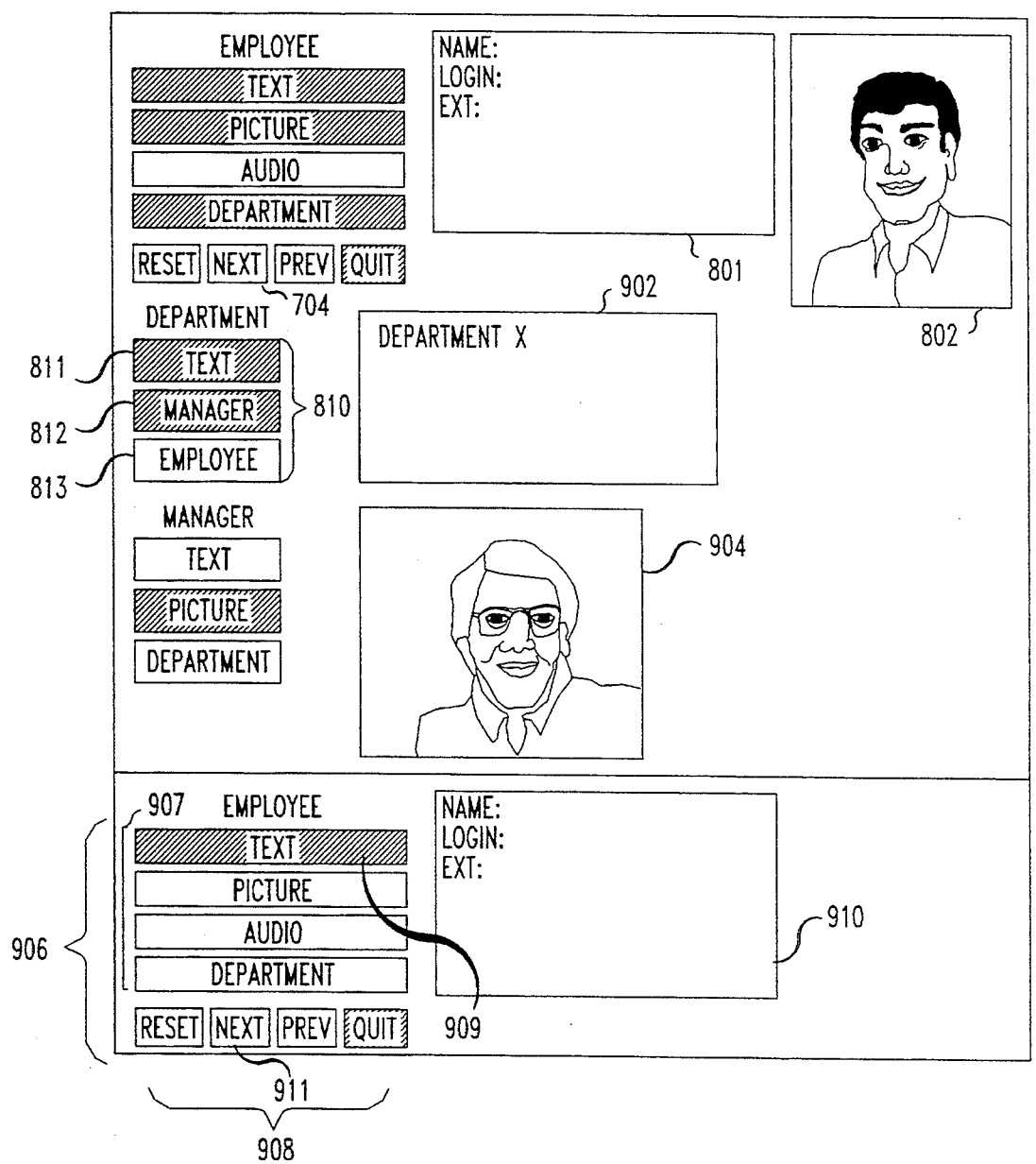

With reference to FIG. 9, if the text button 811 is clicked by the user, the department text display 902 results. If the user clicks the manager button 812, the manager's picture 904 results.

According to one aspect of the browse feature, instead of containing a reference to a single object, an object may contain references to a set of objects. For example, the department object 810 may contain references to all the employees 813 that work in that department. To view employees who work in the same department, the user may click on the employee button 813. This opens up an "object set" window 906 consisting of an object panel 907 to view an employee object and a control panel 908 which enables the user to sequence through the employee of the same department. If the text button 909 is clicked, the text 910 on a colleague working in the same department is displayed. The text associated with the next employee of that department may then be accessed by pressing the next button 911.

Another feature of the present invention is the synchronized browsing feature. The basic browsing paradigm used by display system 120 enables a user to start from an object and then explore the related objects in the database by following the embedded chains of references. To speed up such repetitive database navigations, display system 120 supports synchronized browsing. Once the user has displayed a network of objects (e.g., FIG. 9) and the user applies a sequencing operation to any object in this network, the sequencing operation is automatically propagated over the network.

Figure 10:
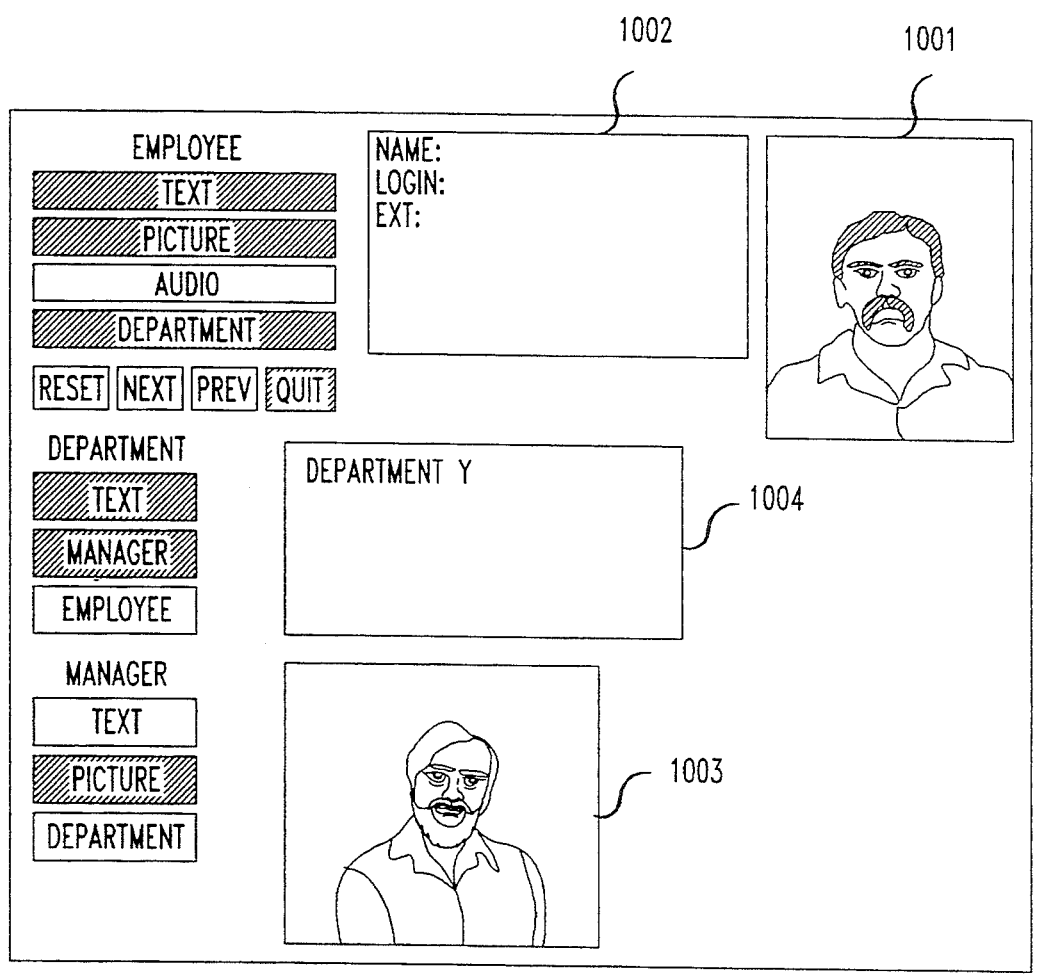

For example, suppose a user has set up the display shown in FIG. 9 to view an employee's manager 904 by following the previously-described chain of references that start from the employee 802. When tile user looks at the "next" employee object, by clicking on button 704, the display system 120 synchronized browsing feature provides the user with the same type of information on the next employee's department and manager. In other words, the display system 120 assumes the user wants the chain of displays starting with the employee object to be automatically updated in a "synchronized" fashion. The synchronized browsing features of the display system 120 provide this capability. Thus, clicking the next button 704 of the employee object-set results in the display shown in FIG. 10. In FIG. 10, the employee object 1001, his text 1002, his manager 1003, and the department text 1003 are displayed. Note that display system 120 thus enables the user to examine several databases and their schemas simultaneously, and within a schema the user can be examining many classes and their objects simultaneously.

Communication Protocol

As previously noted, according to the present invention, display system 120 is isolated from the specifics of the various object classes (e.g., additions, deletions, and modification of object class definition and membership) of database 140. The specifics of the various object classes are the province of the database or class designer. The database designer, however, need not know the specifics of displaying objects (e.g., windowing, etc.), which is the province of display system 120, but need only specify a display function for each object class in database 140. To realize this separation, we have defined a protocol or interface which is understood by both display system 120 and display function 130. Specifically, we have defined a set of generic window types for display system 120 corresponding to the kind of windows that are supported by most windowing systems. Some examples of window types are: static text window, static text window with horizontal and vertical scroll bars, and raster image window. These window types may be parameterized to allow the display function to choose the window sizes and to specify the relative placement between the windows. The display function 130 (see FIG. 11) includes a number of these window types to display an object in multiple ways. The database designer selects the window type, label and other display parameters associated with each object class which are then stored in display function (see 130 of FIG. 11 ). This separation of functions enables new object classes to be added to database 140 without requiring changes or recompilation of the display system 120 software. Moreover changes or upgrades in display system software will not affect the display function 130 of FIG. 11 (unless of course new window types are added).

Figure 13:
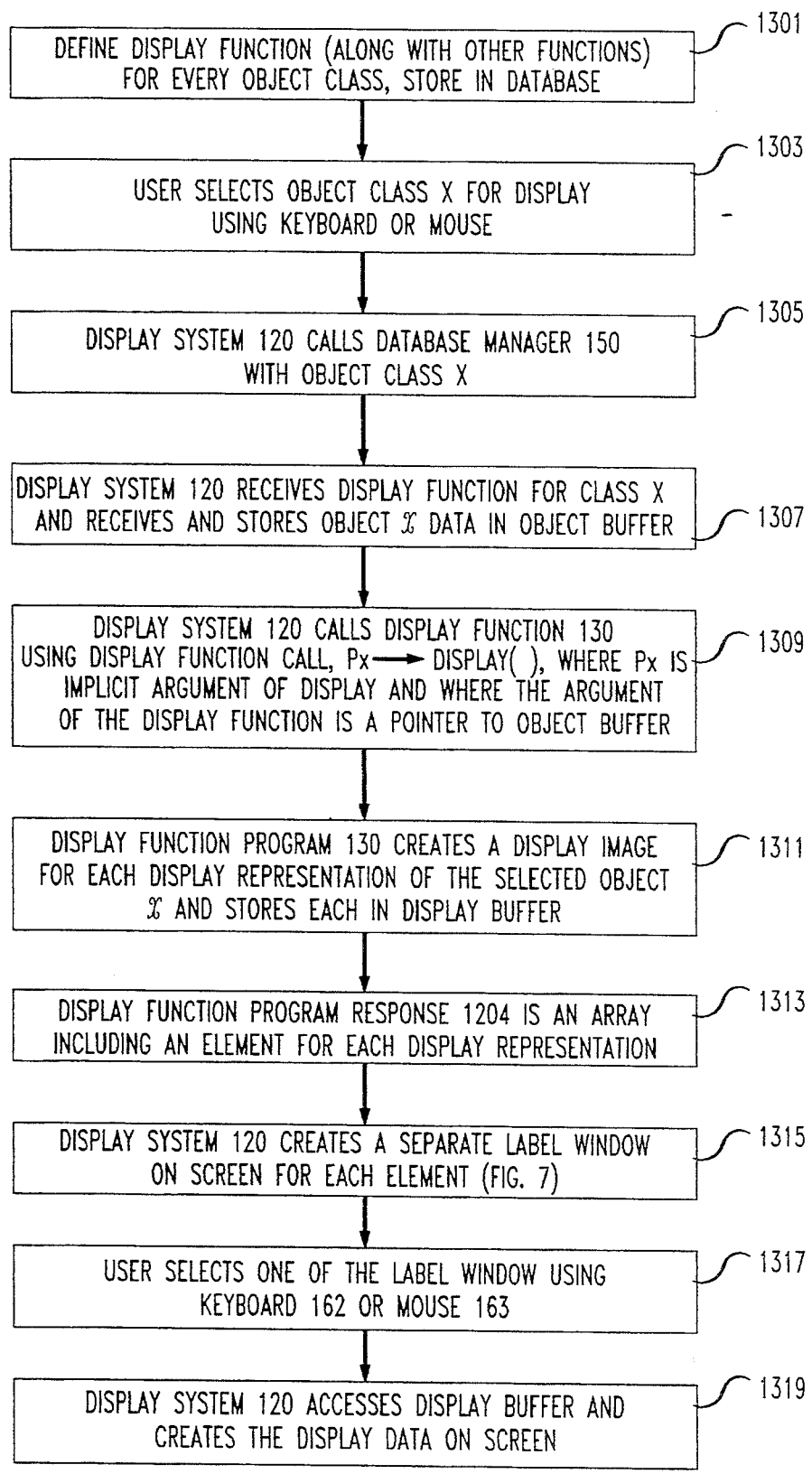
FIG. 13 describes the communication protocol between the display system, database manager and display function.

With reference to FIG. 13, we describe the communication protocol between display system 120 and database manager 150 and between display system 120 and display function 130. In step 1301, the database designer defines a display function (e.g., 130 of FIG. 11) for every object class (e.g., 142-144 of FIG. 1) in database 140 whose objects may be displayed (or outputted if an audio representation of the object exists) by a user. Note, the designer may choose from one or more different window displays which are possible for each representation of an object. Examples include text, bit map, scrollable text, scrollable bit map, and object identification. The object identification (Id) window type is a special value indicating that display system 120 enables the user to optionally request display of an object embedded in the original user-selected object. The window type selected is stored in a display function (130 of FIG. 11) entry associated with the object class. Thus, for example, the window type for employee object class 143 may be different from the window type for the manager object class 142 or department object class 144. In step 1303, the user selects an object χ (e.g., an employee) from object class X (e.g., employee object class 143). As noted before, the user selection is made using keyboard 162 or mouse 163. In step 1305, display system 120 calls database manager 150 with the user-identified object class X using the format illustrated in 1201.

In step 1307, the response of database manager 150 to display system 120 includes the display function 130 for object class X as well as a pointer to object data associated with an object χ of object class X. The format of this response is shown in 1202. Note, even though the user identified only the object class X, the database manager 150 responds with the next object (in our case the first object) of the selected object class X. Display system 120 stores this object data in an object buffer 122.

Display system 120 gets the location of the display function of class X (X::display) from database manager 150 and uses the "dynamic loader" to load X::display (). Without the use of the dynamic loader, display system 120 would need to be compiled with information about all possible object types in the database 140. Under such an arrangement, adding new object classes, changing object class, etc., would require changes to display system 120 or require it to be recompiled. The dynamic loading capability is, therefore, important for an objectoriented database 140 based on a compiled language such as C++ or O++.

In step 1309, display system 120 calls display function 130 using the format shown in 1203, where the argument is a pointer to object buffer 122. Note the format shown in 1203 is a symbolic representation of the call format. The active call format would depend on the particular implementation of display system 120 and display function 130.

As mentioned, an object can have multiple display representations. The display function 130 decides the window type for each display representation. In step 1311, it creates the display image for each display representation and puts it into a display buffer 132. In step 1313, display function 130 response DFR is an array in the format shown in 1204, where each row of the array specifies a particular display format. Thus, for our employee object example, the text, picture and audio information on the employee would each have their own display format parameters such as a button label, a window type, and a pointer to the corresponding display buffer. The label parameter indicates the nature of display (i.e., text, picture, audio, etc.) and is used to create the button label displays of FIG. 7. The window type parameter is required for the object display (i.e., text, bit map, scrollable bit map, etc.) The pointer parameter points to the memory area where the object display has been constructed and stored by the display function 130. As an alternative to the pointer, an object Id identifies an object which is embedded in the original user-selected object.

Since the values returned by the display function 130 must be understood by all object display systems 120 that are to work with database manager 150, the database designer does not need to know the specifics of display system 120. The objects can be displayed by any display system 120 provided it understands that it must call tile appropriate display function and know what to do with the values returned.

Complex Objects

As mentioned in a previous section, if a user-selected object contains embedded references to other objects, then the display panel for displaying objects of this type provides buttons for viewing the referenced objects. These buttons are created in windows of type OID (object id), and the corresponding object id and the display function are associated with each such window. When one of the above buttons is clicked, display system 120 first calls the database manager 150 to get the corresponding object into an object buffer, and then calls (i.e., executes) the associated display function.

Synchronized Browsing

When the user follows a chain of embedded references, a tree of windows is dynamically created and stored by display system 120. This tree maintains the state of each window (open or closed) and pointers to display functions for windows of type OID. When a sequencing action is performed at any node of this tree, the subtree rooted at this node is traversed recursively and data in the corresponding windows is refreshed. Note that the refreshing is done irrespective of whether window is open or closed, as the user may open a window after performing the sequencing operation.

Projection

A straightforward scheme of allowing the user to project on any public member of a class will be inappropriate since tile public members of a C++ class are not limited to being data elements or pure functions—they may be executable functions that do not return a value or cause side effects. We, therefore, require that a database (class) designer provide a function, "displaylist" that returns as its result the list of attributes on which projection can be performed. A rudimentary displaylist display function is automatically synthesized if not explicitly provided by the database designer. Note that these attributes may or may not correspond to the data members (public or private) of the class in question. For example, an attribute to be displayed may actually be computed using other attributes.

When a user wants to see a partial view of an object, the user clicks a "project" button that results in a set of buttons being created, one each for the displayable attributes of tile object. An ALL button (not shown) is also created to allow projection on all attributes. The user selects the projection attributes by clicking on the desired attributes.

Internally, display system 120 calls the displaylist function of the corresponding class, uses the list of attributes returned to create the buttons, and makes a bit vector corresponding to the attributes selected by the user. The bit positions correspond to the positions of the attributes returned by displaylist. As before, display system 120 then calls the database manager 150 to get a stored representation of the object in a buffer, and then invokes the corresponding display function.

In such an arrangement, tile display function is required to take an additional argument. This argument is a bit vector representing the user's selection of attributes to be displayed. The display function uses the bit vector argument to determine which attributes are to be shown in the object displays created by it. If the bit vector argument is not supplied, then the display function uses a default bit vector (chosen by the database designer) to display the object. The attributes displayed by default may be a subset or superset of attributes returned by the displaylist function. Using the bit vector, the display function creates an appropriate display buffer and returns it to display system 120 to display the object.

Selection

When viewing objects in a cluster, a user may selectively view only a subset of the objects in the cluster. In this case, the user may specify a selection predicate to select the objects to be displayed. As in the case of projection, the user must be informed as to what attributes can be used to construct the selection predicate. One embodiment limits the attributes returned by the selectlist function. A rudimentary selectlist display function is automatically synthesized if not explicitly provided by the database designer.

Having displayed the list of attributes that can participate in a selection predicate, the user may use them to form the selection expression using a scheme similar to one proposed in E. Neuhold and M. Stonebraker, "Future Directions in DBMS Research", Tech. Rep.-88-001, Int'l. Computer Science Inst., Berkeley, Calif. May 1988. In that scheme, a predicate is formed by selecting from a menu of attribute names and operators and typing in values (or selecting values if there are only a few of them). Another alternative is to use a condition box similar to that disclosed in D. D. Chainberlin, M. M. Astrahah, K. P. Eswaran, P. P. Griffiths, R. A. Lorie, J. W. Mehl, P. Reisner and B. W. Wade, "SEQUEL 2: A Unified Approach To Data Definition, Manipulation, and Control", RJ, 1978, IBM, June 1976. In such an arrangement, the user types in the selection condition as a string. The first scheme may be desirable for simple selection predicates whereas the second scheme may be preferable for complex predicates.

Once display system 120 has obtained the selection predicate, it passes the selection predicate to the display manager 150 which uses it to filter objects retrieved from database 140. Once an object has been selected and its memory copy is provided to display system 120 it is displayed using the implementation described earlier.

While the present invention has described a display function as being associated with a data item class it may also be associated with a plurality of data item classes or with one or more data items. Moreover, the system may permit the user to directly select a data item directly rather than selecting a data item class and stepping through data items of that class. Hence, it should be apparent that the foregoing merely illustrates the principles of the invention. It can be appreciated that different system configurations may be implemented to embody the present invention. Moreover, the screen display, user-interaction sequence with the display system, the features of the display function and other aspects of the system are illustrative and may be implemented in a variety of formats to implement the present invention. Additionally, the data format of the display function 130 may be changed to provide additional parameters required by other components of the system or to provide additional features to the system.

While the teachings of the present invention can be utilized both to display tuples stored in a relational database and to display objects stored in an object data base, the present disclosure has described only the latter embodiment. Implementation of the present invention to display tuple data items of a relational database may be carried out in a straight-forward manner using the present disclosure as a guide. Thus, the teaching of the present invention may be more generally utilized to display any of a variety of data items (tuples, objects, etc.) stored in a corresponding database (relational, object, etc.).

Thus, what has been described is a preferred embodiment of the invention. Other methods, sequences or arrangements can be used to implement the present invention by those skilled in the art without departing from the spirit and scope of the present invention.

We claim:

1. A method of communicating between one or more databases, including at least a relational or an object database, and a display apparatus, said communication identifying data objects in said database which are displayed by said display apparatus, the method comprising a plurality of steps including storing a display function us associated with each of one or more input-selectable classes of data objects stored in said database;

in response to an input selecting one of said object classes from said database, obtaining an associated display function and executing said display function for one or more objects, of said object class, to be displayed at said display apparatus, said displayed objects being specified by data received in a protocol communication, said protocol controlling communications between said database and said display apparatus and including 1) one or more window types used by said display apparatus for said displayed objects, 2) one or more labels for labeling each of the window types for said displayed objects, and 3) data for providing a display for each window type of said displayed objects; and at said display apparatus, receiving said protocol and creating for each of said window types a display representation of said displayed objects, using the received data and the labels.

2. The method of claim 1 wherein at least one of said window types specifies a graphical image representation of at least one of said displayed objects.

3. The method of claim 1 wherein at least one of said window types specifies a bitmap image representation of at least one of said display objects.

4. The method of claim 1 wherein at least one of said window types specifies text associated with at least one of said displayed objects.

5. The method of claim 1 wherein at least one of said window types outputs an audio message associated with at least one of said displayed objects.

6. The method of claim 1 wherein said data in said protocol is a pointer to a data buffer.

7. Apparatus for communicating between one or more databases, including at least a relational or an object database, and a display apparatus, said communication identifying data objects in said database which are displayed by said display apparatus, said apparatus including
   means for storing a display function associated with each of one or more input-selectable classes of data objects stored in said database;
   means, responsive to an input selecting one of said object classes from said database, for obtaining an associated display function and executing said display function for one or more objects, of said selected object class, to be displayed at said display apparatus, said displayed objects being specified by data received in a protocol communication, said protocol controlling communications between said database and said display apparatus and including
   1) one or more window types used by said display apparatus for said displayed objects,
   2) one or more labels for labeling each of the window types for said displayed objects, and
   3) data for providing a display for each window type of said displayed objects; and
   means, at said display apparatus, for receiving said protocol and creating for each of said window types a display representation of said displayed objects, using the received data and the labels.

8. A method of operating a display apparatus for displaying one or more data objects obtained from one or more databases, including at least a relational or an object database, the method comprising a plurality of steps including
   receiving a protocol communicated from said database, said protocol controlling communications between said database and said display apparatus and including
   1) one or more window types used by said display apparatus for said displayed objects,
   2) one or more labels for labeling each of the window types for said displayed objects, and
   3) data for providing a display for each window type of said displayed objects; and
   processing said received protocol and creating for each of said window types a display representation of said displayed objects, using the received data and the labels.

9. The method of claim 8 wherein at least one of said window types specifies a graphical image representation of at least one of said displayed objects.

10. The method of claim 8 wherein at least one of said window types specifies a bitmap image representation of at least one of said displayed objects.

11. The method of claim 8 wherein at least one of said window types specifies text associated with at least one of said displayed objects.

12. The method of claim 8 wherein at least one of said window types outputs an audio message associated with at least one of said displayed objects.

13. The method of claim 8 wherein said data in said protocol is a pointer to a data buffer.

14. Display apparatus for displaying one or more data objects obtained from one or more databases, including at least a relational or an object database, said apparatus comprising
   means for receiving a protocol communicated from said database, said protocol controlling communications between said database and said display apparatus and including
   1) one or more window types used by said display apparatus for said displayed objects,
   2) one or more labels for labeling each of the window types for said displayed objects, and
   3) data for providing a display for each window type of said displayed objects; and
   means for processing said received protocol and creating for each of said window types a display representation of said displayed objects using the received data and labels.

15. A method of operating a database apparatus, having one or more databases, including at least a relational or an object database, for use with an associated display apparatus, the method comprising a plurality of steps including
   storing a display function associated with each of one or more input-selectable classes of data objects stored in said database;
   in response to an input selecting one of said object classes from said database, obtaining an associated display function and executing said display function for one or more objects, of said selected object class, to be displayed at said display apparatus, said displayed objects being specified by data received in a protocol communication, said protocol controlling communications between said database and said display apparatus and including
   1) one or more window types used by said display apparatus for said displayed objects,
   2) one or more labels for labeling each of the window types for said displayed objects, and
   3) data for providing a display for each window type of said displayed objects.

16. The method of claim 15 wherein at least one of said window types specifies a graphical image representation of at least one of said displayed objects.

17. The method of claim 15 wherein at least one of said window types specifies a bitmap image representation of at least one of said displayed objects.

18. The method of claim 15 wherein at least one of said window types specifies text associated with at least one of said displayed objects.

19. The method of claim 15 wherein at least one of said window types outputs an audio message associated with at least one of said displayed objects.

20. The method of claim 15 wherein said data in said protocol is a pointer to a data buffer.

21. A database apparatus, having one or more databases, including at least a relational or an object database, for use with an associated display apparatus, said display apparatus comprising
   means for storing a display function associated with each of one or more input-selectable classes of data objects in said database;
   means, responsive to an input selecting one or said object classes from said database, for obtaining an associated display function and executing said display function for one or more objects, of said selected object class, to be displayed at said display apparatus, said displayed objects being specified by data received in a protocol communication, said protocol controlling communications between said database and said display apparatus and including
   1) one or more window types used by said display apparatus for said displayed objects,
   2) one or more labels for labeling each of the window types for said displayed objects, and
   3) data for providing a display for each window type of said displayed objects.

* * * * *